T. WRIGHT.
Broom.
No. 2,598. Reissued May 14, 1867.
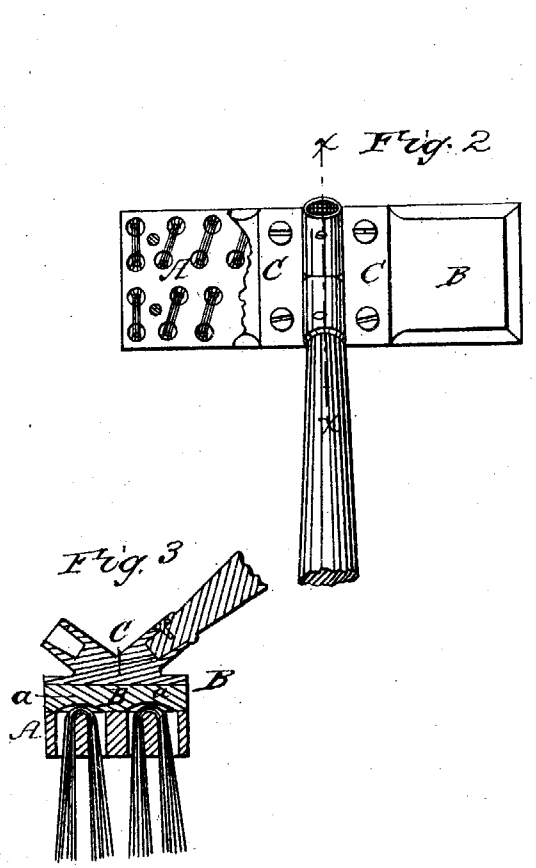
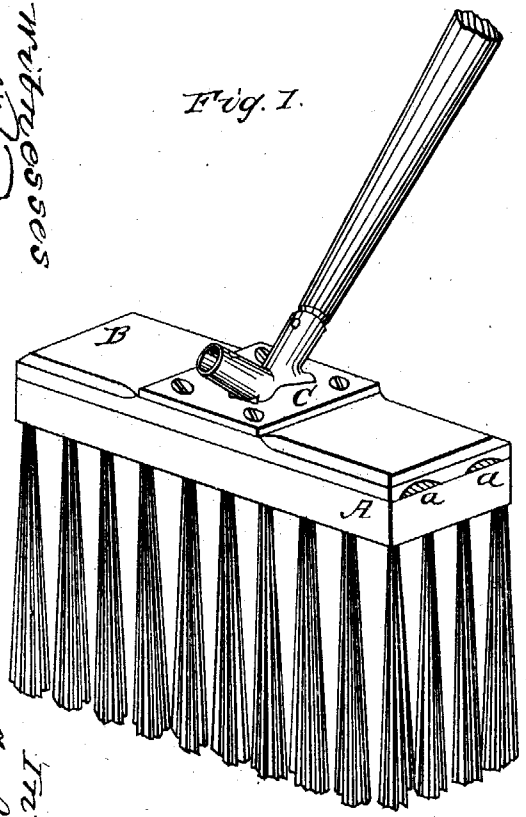
Witnesses
H. H. Young
W. S. Chapman
Inventor.
Thos Wright
David H. Bum
Atty.
N. PETERS, Photo-Lithographer, Washington, D. C.

United States Patent Office.

WILLIAM H. CORY, OF NEW YORK, N. Y., ASSIGNEE BY MESNE ASSIGNMENTS OF THOMAS WRIGHT.

*Letters Patent No.* 59,733, *dated November* 13, 1866; *reissue No.* 2,598, *dated May* 14, 1867.

IMPROVED BROOM.

The Schedule referred to in these Letters Patent and making part of the same.

TO ALL WHOM IT MAY CONCERN:

Be it known that the following is a full, clear, and exact description of a new and useful Improvement on Brooms invented by THOMAS WRIGHT of the city, county, and State of New York, reference being had to the accompanying drawing, forming part of this specification, and in which—

Figure 1 is a view in perspective of the improved broom as constructed for out-door work, showing the double socket for securing the handle.

Figure 2, a top or rear view of the same showing a portion of the upper plate or back broken away, and illustrating by blue lines the manner of inserting the splints or wires; and Figure 3 a sectional view taken as denoted by the line *x x* in fig. 1.

Similar letters indicate the same parts in all the figures.

The nature of this invention consists in a novel mode of fitting and holding the splints or strips in the head of the broom by means of apertures formed in pairs in the base-plate, and united at their tops or inner ends, where the splints are looped to project through either aperture, and where they are held by a back plate in their places. Said invention also further consists in a double and reverse angular socket attachment for insertion of the handle in opposite directions to equalize wear of the broom or brush.

Referring to the accompanying drawing, the broom is here represented as provided with a heavy wooden base-plate, A, pierced through with a regular series of apertures arranged in pairs, preferably at equal intervals apart. Small bundles of splints or strips of suitable material, and which may be of metal, of a proper length, are doubled or looped and inserted respectively through the apertures, forming each pair in the series, leaving their free ends projecting equally from the plate to any desired length. When the plate or base A is filled the splints or strips are secured to their places therein by nailing or otherwise fastening a second or back-plate, B, upon the upper or rear side of the base-plate, so as to cover and bear upon their loops. In order to permit the second or back-plate to close snugly and neatly down upon the base-plate, grooves or recesses *a* may be cut in one or the other plates, or in both, thus uniting at their inner ends the apertures in the base-plate, as arranged in pairs, through which the splints or strips are passed, and out of or from which they project, said grooves or recesses *a* serving to receive the necessary loop-shaped projection of the splints or strips where they are bent over the spaces between each pair of apertures. Upon top of the upper plate of the broom may be secured a metallic piece, C, having two sockets for a handle formed or placed therein, and so as to project therefrom preferably at similar angles in opposite directions in the same right line. By this latter construction or provision, which may be applied to different kinds of brooms or brushes, the operator is enabled, when the broom becomes worn down in one direction, to transfer the handle to the other side, which admits of wear in an opposite direction and compensating manner, as it were. Where wire or metal splints or strips are used for the broom, and which should be made from rolled wire, the same may be formed of flat refuse crinoline springs, otherwise usually valueless excepting as old metal, whereby such brooms can be made at a comparatively low cost and increased durability secured.

What is here claimed as new and useful, and desired to be secured by Letters Patent, is—

The splints or strips, made of any suitable material, inserted in bundles through apertures formed in pairs in the base-plate of the broom, by looping them as described, said apertures being connected by a groove or recess to accommodate the loop, and the latter held to its place by a back or upper plate, substantially as shown and described.

WM. H. CORY.

Witnesses:

HENRY T. BROWN,

A. LE CLERC.